Figure 1:
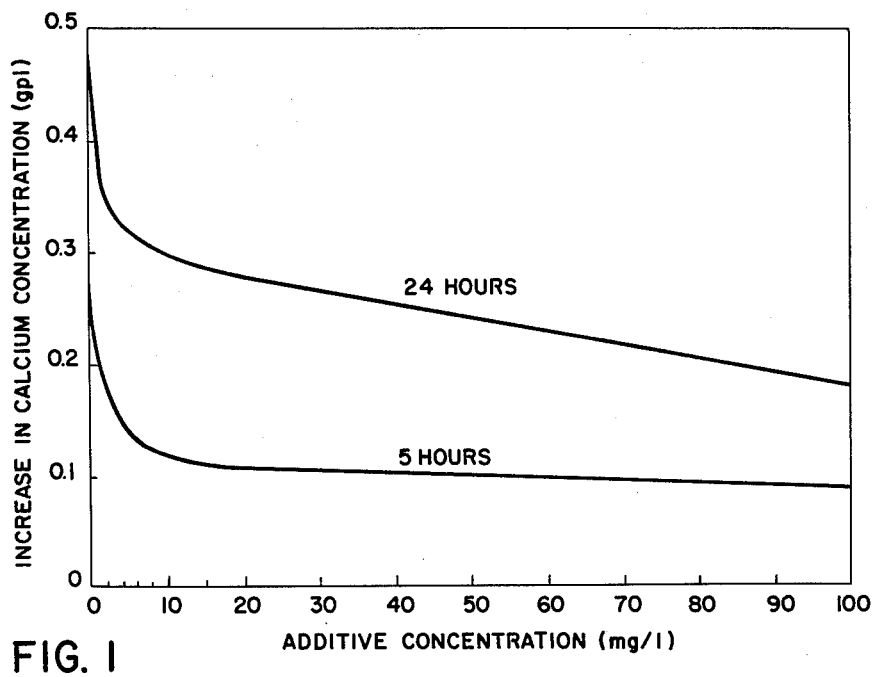

3,140,915
METHOD OF INHIBITING DISSOLUTION OF CALCIUM SULFATE
Bernard A. Axelrad, Raphael F. Matson, and Freddie J. Touro, New Orleans, La., assignors to Freeport Sulphur Company, New York, N.Y., a corporation of Delaware
Filed Aug. 13, 1962, Ser. No. 216,591
18 Claims. (Cl. 23—89)

This invention relates to a method for inhibiting the dissolution of calcium sulphate in aqueous solutions, and more particularly relates to a method for inhibiting the dissolution of calcium sulphate into a brine produced by dissolving an alkali-metal halide, especially sodium chloride, with water.

High purity brines are required for many processes and industrial uses. Sodium chloride brine, for instance, is used in the production of metallic sodium, chlorine, numerous sodium compounds, such as soda ash, caustic soda and sodium chloride, and is also used in the production of sulphur by the Frasch process. One method of preparing brine is by the dissolution of underground salt masses with fresh or sea water which is injected into the mass, the brine formed being withdrawn as a concentrated solution.

All natural alkali-metal halides are relatively impure. Among the most troublesome contaminating materials is calcium sulphate which may be present in amounts up to 1% or more, that is, 10,000 parts per million or more. Calcium sulphate is only slightly soluble in fresh water but is more soluble in brine, its solubility increasing as the salt concentration of the brine is increased. Calcium sulphate becomes less soluble in either fresh water or brine as the temperature of the solution is raised. Thus, if a solution nearly saturated with calcium sulphate is heated, calcium sulphate precipitates gradually. Precipitation of the calcium sulphate during crystallization of salt from brine will cause contamination of the salt being crystallized. Moreover, the calcium sulphate tends to precipitate on the walls of heaters and associated equipment as a glass-hard, continuous scale that interferes with heat transfer and reduces the open area of conduits through the equipment.

The low solubility of calcium sulphate precludes economical removal of the scale from equipment surfaces. Not only is the calcium sulphate only slightly soluble in water, it is also impervious to acids and is very slowly attacked by strong bases, even when hot. Mechanical methods are generally resorted to for its removal, but these must be so violent, due to the extreme hardness of the scale, that the equipment being cleaned is frequently seriously damaged.

Solutions proposed to date to cure the problem have consisted in attempts to inhibit the precipitation of the calcium sulphate after it has been dissolved in the solution. These methods have been found to be expensive, time consuming and inefficient. Attempts have been made to solve the problem by preventing the calcium sulphate from dissolving in the brine in the first place. One method utilizes sodium carbonate or phosphate added to the aqueous solvent prior to bringing it into contact with the contaminated halide to be dissolved. Another method utilizes sodium polyphosphates in the same way. Both methods have the disadvantage that if the water being used as the solvent contains appreciable calcium, the additive will be precipitated before it contacts the calcium sulphate particles.

Accordingly, it is an object of this invention to provide a method for inhibiting the dissolution of calcium sulphate into an aqueous solvent during the dissolution of salt (i.e., sodium chloride or other alkali-metal halide) into the aqueous solvent.

It is a special object of this invention to reduce the rate at which calcium sulphate is dissolved in aqueous solutions while dissolving alkali-metal halides.

It is a further object of the present invention to provide a method of preparing a brine from a solid salt, especially sodium chloride in which the dissolution of calcium sulphate into the resulting brine is inhibited.

Figure 2:
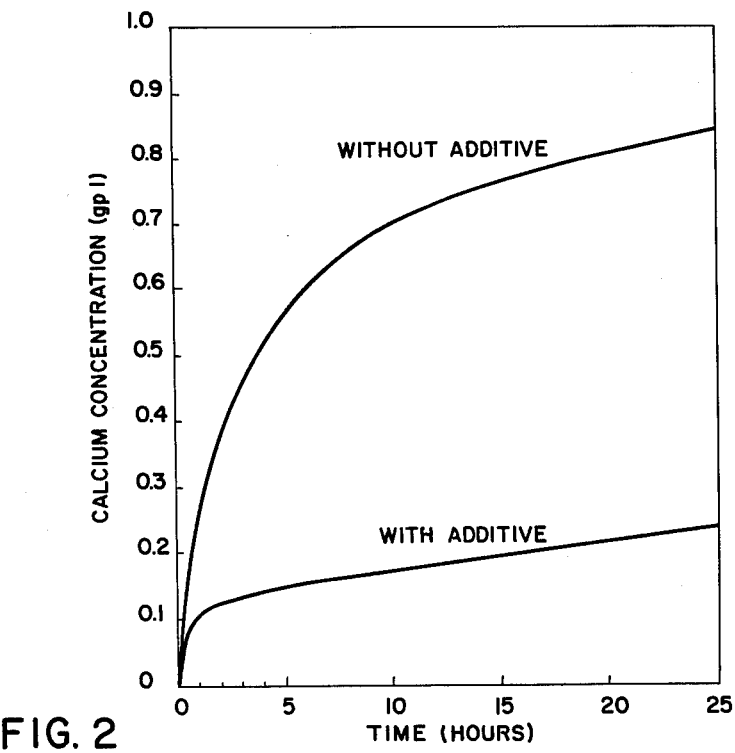

Other objects will be apparent to those skilled in the art from reading the following description taken in conjunction with the drawings, in which:

FIGURE 1 is a graph showing the effect of additive concentration on the solution of calcium sulphate, and FIGURE 2 is a graph which shows the influence of time and the use of one of the additives of the invention on the dissolution rate of calcium sulphate.

The present invention results from the discovery that a class of compounds, unrelated to any of those known for the purpose before, reduces the rate of dissolution of calcium sulphate during the process of dissolving the alkali-metal halide with which the calcium sulphate is usually present. The members of this class of compounds vary from one another in cost, commercial availability, stability at elevated temperatures, and degree of calcium sulphate solution rate reduction, thus making it possible to choose from among the class, a compound which is most economical and suitable for a particular purpose.

It has been found that the dissolution of calcium sulphate present as an impurity in natural alkali-metal halide formations can be inhibited by introducing into the solvent small quantities of alkali-metal or ammonium salts or hydrogen ion compounds which are made up of certain active groups attached to at least one hydrocarbon group containing between 2 and 30 carbon atoms per active group. The active groups which are useful in the practice of this invention includes the sulfonates, sulfates, carboxylates, orthophosphates, phosphites, phosphonates, and phosphonites. The hydrocarbon group may be substituted or unsubstituted and may be aliphatic, alicyclic, aromatic or heterocyclic.

It has been further found that for the inhibiting compound to be useful in the practice of this invention, the product of its reaction with the calcium present must be less soluble than calcium sulphate under the conditions of use.

The inhibiting compound used must be soluble to the extent of at least 2 milligrams per liter of solution. The inhibiting compound may be present at a concentration of 2 to 1000 milligrams or more per liter of solution, and preferably is present in a concentration range of 5 to 100 milligrams per liter. Amounts in excess of 1000 milligrams per liter usually do not provide any useful purpose and are wasteful. The solution in which the inhibiting compound is used should contain not less than three weight percent of the alkali-metal halide by the time that it is withdrawn from contact with the undissolved calcium sulphate.

The inhibiting compound may be dissolved in the aqueous solvent before the aqueous solvent is brought into contact with the halide to be dissolved, or the calcium sulphate-contaminated alkali-metal halide may be mixed with the compound in either its solid form or in concentration solution prior to bringing the water into contact with the alkali-metal halide.

Inhibiting compounds found operable in the practice of this invention include:

(1) Carboxylates:
    (*a*) Sodium polyacrylate
    (*b*) Sodium carboxymethyl cellulose
    (*c*) Sodium caseinate
    (*d*) Sodium salt of picolinic acid
    (*e*) Sodium salt of 2-thiophene-carboxylic acid
    (*f*) Sodium salt of aminooctanoic acid (2) Sulfonates:
   (a) Dodecyl benzene sulfonate
   (b) Decyl benzene sulfonate
   (c) Sodium isopropyl naphthalene sulfonate
   (d) Nonyl benzene sulfonate
   (e) Sodium dodecylated oxydibenzene disulfonate (3) Sulfonate-Carboxylates:
   (a) Disodium N-octadecyl sulfosuccinamate (4) Sulfates:
   (a) Sodium sulfate derivate of 7-ethyl, 2-methyl-undecanol-4
   (b) Sodium salt of the sulfate ester of alkylphenoxy-poly(ethyleneoxy) ethanol (Alipal CO–433 of General Aniline and Film Corporation)

(5) Phosphates:
   (a) Sodium salt of dibutyl phosphate (6) Phosphites:
   (a) Sodium salt of diphenyl phosphite (7) Phosphonates:
   (a) Sodium salt of benzenephosphonic acid (8) Phosphonites:
   (a) Sodium salt of benzenephosphonous acid Certain compounds are preferred because of their effectiveness, low cost, resistance to decomposition at elevated temperatures of about 170° F., and their resistance to precipitation by the ions initially present in sea water. The preferred compounds are: dodecyl benzene sulfonic acid, sodium carboxymethyl cellulose, sodium dodecyl benzene sulfonate, and sodium polyacrylate.

In the test represented by the data illustrated in FIGURE 1, sodium carboxymethyl cellulose was added to synthetic sea water in the amounts indicated. A saturated brine was produced by slowly agitating the synthetic sea water in contact with excess sodium chloride containing 1.3 weight percent of calcium as the sulphate. The amount of dissolved calcium sulphate present in the solvent was determined initially. The increase in calcium sulphate concentration at the end of five hours and at the end of twenty-four hours was determined and plotted on the graph.

FIGURE 1 shows that amounts as small as about 5 milligrams of the inhibiting compound per liter of solution, inhibited dissolution of calcium sulphate considerably. The decrease in the dissolution rate of the calcium sulphate is not, however, proportional to the concentration of the inhibiting compound. Concentrations above about 15 milligrams of inhibiting compound per liter, produced a less marked additional effect.

FIGURE 1 demonstates that small concentrations of an inhibiting compound greatly reduce the amount of calcium sulphate which dissolves during the saturation of an aqueous solution with sodium chloride. FIGURE 1 also shows that greater concentrations of the inhibiting compound do not produce proportionally greater reductions in calcium sulphate dissolution.

The tests illustrated by the graph of FIGURE 2 were conducted by producing saturated brine by slowly agitating distilled water in contact with excess sodium chloride containing 1.3 weight percent of calcium as the sulphate. The brine was prepared both with and without an addition of 20 milligrams of sodium dodecyl benzene sulfonate per liter of solution.

FIGURE 2 indicates that the added inhibiting compound reduces the rate at which the calcium sulphate dissolves. The solution, with the inhibiting compound present, continues to increase in calcium content as the time of its contact with the calcium sulphate increases. However, the rate of increase of calcium content is much slower than that of a solution without the compound present.

The inhibiting compounds generally become more effective as the pH of the solvent is increased. Some of the compounds, for instance sodium caseinate and sodium polyacrylate, hydrolyze at low pH to poorly ionized acids and become ineffective. With such compounds it is necessary to utilize a pH high enough to prevent hydrolysis.

Table I below illustrates that the compounds generally become more effective at higher pH's. The examples contained in Table I were prepared by adding 750 milliliters of synthetic sea water, having a pH of 8, and containing 0.4 gram per liter of calcium as the sulphate, to 450 grams of coarsely crushed sodium chloride salt core containing 1.3 weight percent of calcium as the sulphate. Slow agitation of the solution was started immediately upon addition of the solution to the salt core. Samples of solution were taken at different time intervals for calcium determinations. Before starting the test, the inhibiting compounds used for suppressing the rate of solution of calcium suphate were added to produce a concentration of 20 milligrams per liter in the synthetic sea water, and hydrochloric acid or sodium hydroxide was used to adjust the pH.

TABLE I.—CALCIUM INCREASE IN GRAMS PER LITER AFTER 24 HOURS

| pH | Blank | Sodium Polyacrylate | Sodium Carboxymethyl Cellulose | Sodium Dodecyl Benzene Sulphonate |
|---|---|---|---|---|
| 2 | 0.75 | 0.75 | | 0.4 |
| 4 | 0.6 | 0.4 | 0.3 | 0.3 |
| 8 | 0.4 | 0.25 | 0.25 | 0.15 |
| 10 | 0.3 | | | 0.05 |

In order to disclose more clearly the nature of the present invention, the following examples illustrating the invention are presented. It should be understood, however, that this is done solely by way of example and is intended neither to delineate the scope of the invention nor limit the ambit of the appended claims.

*Example 1*

To 450 grams (g.) of coarsely crushed sodium chloride salt core containing 1.3 weight percent of calcium as the sulphate were added 750 milliliters (ml.) of distilled water. Slow agitation of the solution was started immediately upon adding the solution to the salt core. Samples were taken at different time intervals for calcium determination. At the end of twenty-four hours the calcium concentration was 0.85 gram per liter (g.p.l.).

The above experiment was repeated, except that 20 milligrams of sodium dodecyl benzene sulfonate per liter were added to the distilled water prior to starting the test. At the end of twenty-four hours the calcium concentration was 0.25 g.p.l. Thus, the concentration of calcium sulphate after twenty-four hours using the inhibiting compound was only 29 percent as large as the calcium concentration where the inhibiting compound was not used.

In carrying out the experiment, the liquid was stirred at a slow rate so that only the smallest particles were barely lifted and moved in the solution. It was found that the rate of solution of calcium compounds was affected by conditions of agitation. It was also found that regardless of the speed of agitation the addition of the inhibiting compounds always showed a marked reduction in the rate of dissolution of the calcium sulphate into the solution.

*Examples 2–10*

The procedure of Example 1 was repeated using different inhibiting compounds. Samples were taken for calcium determinations. The inhibiting compounds used for suppressing the rate of solution of calcium sulphate were added to produce a 20 mg. per liter concentration in the solvent.

Table II lists the calcium concentration in grams per liter which were found in the solvent after twenty-four hours of contact time.

TABLE II

| Example | Inhibiting Compound Used | Calcium, grams per liter (g.p.l.) |
|---------|--------------------------|-----------------------------------|
|         | Blank (no compound added) | 0.8 |
| 2       | Dodecyl benzene sulphonic acid | 0.25 |
| 3       | Sodium caseinate | 0.25 |
| 4       | Sodium isopropyl napthalene sulphonate | 0.25 |
| 5       | Sodium 7-ethyl, 2-methyl-undecyl-4-sulphate | 0.25 |
| 6       | Disodium N-octadecyl sulphosuccinamate | 0.35 |
| 7       | Sodium dodecylated oxydibenzene disulphonate | 0.35 |
| 8       | Sodium alkyl aryl polyether sulphonate | 0.45 |
| 9       | Sodium polyacrylate | 0.65 |
| 10      | Sodium carboxymethyl cellulose | 0.65 |

Table II shows the relative effectiveness of the various additives in inhibiting the dissolution of calcium sulphate into an aqueous solvent containing an alkali-metal halide.

Examples 11–22

In order to demonstrate the breadth of the present invention, compounds representative of each of the classes of inhibiting compounds which are operative in this invention were tested for their effectiveness in inhibiting calcium sulphate dissolution in aqueous solutions of alkali-metal halides. In carrying out the tests, 750 ml. of synthetic sea water containing 0.4 g.p.l. (grams per liter) of calcium as sulphate were added to 450 g. of coarsely crushed sodium chloride salt core containing 1.3 weight percent of calcium as the sulphate. Slow agitation of the solution was started immediately upon adding the solution to the salt core. Samples were taken for calcium determinations. The inhibiting compounds used for suppressing the rate of solution of calcium sulphate were added to produce a 20 milligram concentration per liter of total solution. The calcium increase in grams per liter after twenty-four hours contact time is shown in Table III.

TABLE III

| Example | Class | Representative Compound | Calcium Increase, g.p.l. |
|---------|-------|-------------------------|--------------------------|
|         |       | Blank (no compound added) | 0.4 |
| 11      | Sulphonate | Sodium dodecyl benzene sulphonate | 0.15 |
| 12      | Sulphate | Sodium 7-ethyl, 2-methylundecyl-4-sulphate | 0.15 |
| 13      | Carboxylate | Sodium caseinate | 0.15 |
| 14      | Orthophosphate | Sodium salt of dibutyl phosphate | 0.25 |
| 15      | Phosphite | Sodium salt of diphenyl phosphite | 0.3 |
| 16      | Phosphonate | Sodium salt of benzene phosphonic acid | 0.3 |
| 17      | Phosphonite | Sodium salt of benzene phosphonous acid | 0.3 |
| 18      | Sulphonate-carboxylate | Sodium N-octadecylsulphosuccinamate | 0.2 |
| 19      | Unsubstituted hydrocarbon | Sodium polyacrylate | 0.25 |
| 20      | Substituted hydrocarbon | Sodium carboxymethyl cellulose | 0.25 |
| 21      | Acid form | Dodecyl benzene sulphonic acid | 0.15 |
| 22      | Ammonium form | Ammonium polyacrylate | 0.25 |

Table III, in Examples 11 through 18, shows the active groups which are operative in the practice of this invention. Examples 19 and 20 show that the hydrocarbon group to which the active group is attached may be either unsubstituted (sodium polyacrylate) or substituted (sodium carboxymethyl cellulose).

Table III also shows that various forms of the compounds may be used. Examples 11 through 20 demonstrate the effectiveness of the alkali-metal form. Example 21 demonstrates the effectiveness of the acid form, and Example 22 demonstrates the effectiveness of the ammonium form of the compound.

Based on the above findings, it was determined that a brine having reduced calcium sulphate impurity may be produced by the dissolution of underground salt deposits by a procedure similar to the following. First, an inhibiting compound is added to the aqueous solvent, which may be fresh water or sea water, either natural or synthetic. Second, the aqueous solvent is injected into the salt bearing formation in the usual manner well known in the art. Third, the brine is removed from the salt bearing formation in the usual manner. The resulting brine is lower in calcium sulphate content than brine prepared without the addition of the inhibiting compound to the aqueous solvent.

The following example illustrates the prepartion of a brine of reduced calcium sulphate content from an underground salt mine.

Example 23

Using ordinary sea water, containing initially on an average of about 1400 mg. of calcium sulphate per liter, there was added approximately 10 mg. of the sodium salt of carboxymethyl cellulose additive per liter of sea water. The sea water containing the additive was pumped into the large cavity of an underground salt mine. Previous to the test, brines produced by pumping the same sea water, without the sodium salt of carboxymethyl cellulose additive, produced a brine containing 3700 mg. of calcium sulphate per liter of brine. When the operation was conducted using the same sea water containing the 10 mg. of sodium salt of carboxymethyl cellulose per liter, the brine produced was found to contain progressively lesser amounts of calcium sulphate during the brine-producing operation as indicated by Table IV below.

TABLE IV

| Number of days of operation: | Amount of calcium sulphate in the resulting brine, mg. $CaSO_4$ per liter |
|------------------------------|--------------------------------------------------------------------------|
| 2  | 3,620 |
| 5  | 3,320 |
| 9  | 3,060 |
| 20 | 2,880 |
| 25 | 2,640 |
| 50 | 2,630 |
| 75 | 2,540 |

This test, which was conducted under actual brine-forming conditions, shows the marked reduction in the amount of calcium sulphate which is dissolved in forming the brine. The reason for the progressive effect was that the cavity in the underground mine was so large that it took time to provide an adequate concentration of sodium salt of carboxymethyl cellulose in the mine since it was diluted by water already in the mine. The progressive reduction in content of calcium sulphate in the brine lowered the calcium sulphate content to a level which made the resulting brine usable for sulphur mining by the Frasch process.

The terms and expressions which have been employed are used as terms of description and not of limitation, and there is no intention, in the use of such terms and expressions of excluding any equivalents described or portions thereof, but it is recognized that various modifications are possible within the scope of the invention claimed.

What is claimed is:

1. A method for inhibiting the dissolution of calcium sulphate into an aqueous solvent comprising dispersing into the aqueous solvent an inhibiting compound having at least one active group selected from the class consisting of sulphonate, sulphate, carboxylate, phosphate, phosphite, phosphonate and phosphonite radicals, said active group being attached to at least one hydrocarbon group containing from about 2 to 30 carbon atoms per active group, said compound combining with calcium to form a product that is less soluble than calcium sulphate.

2. A method according to claim 1 wherein from 2 to 1000 milligrams of said inhibiting compound are dissolved in each liter of solvent.

3. A method according to claim 1 wherein from 5 to 100 milligrams of said inhibiting compound are dissolved in each liter of solvent.

4. A method according to claim 1 wherein the calcium sulphate is present with alkali-metal halides and the solution produced contains at least 3 weight percent of the alkali-metal halide.

5. A method according to claim 1 wherein said compound is dodecyl benzene sulphonic acid.

6. A method according to claim 1 wherein said compound is sodium carboxymethyl cellulose.

7. A method according to claim 1 wherein said compound is sodium dodecyl benzene sulphonate.

8. A method according to claim 1 wherein said compound is sodium polyacrylate.

9. A method according to claim 1 wherein said compound is sodium caseinate.

10. A method according to claim 1 wherein said compound is sodium isopropyl naphthalene sulphonate.

11. A method according to claim 1 wherein said compound is sodium 7-ethyl, 2 methyl-undecyl-4-sulphate.

12. A method according to claim 1 wherein said compound is disodium N-octadecyl sulphosuccinamate.

13. A method according to claim 1 wherein said compound is sodium dodecylated oxydibenzene disulphonate.

14. A method according to claim 1 wherein said compound is a sodium alkyl aryl polyether sulphonate.

15. A method of preparing brine from an aqueous solvent and a solid alkali-metal halide containing calcium sulphate as an impurity comprising adding to the aqueous solvent no later than simultaneous with the contact of the solvent with the halide a compound having at least one active group selected from the class consisting of sulphonate, sulphate, carboxylate, phosphate, phosphite, phosphonate and phosphonite radicals, said active group being attached to a hydrocarbon group containing between about 2 to 30 carbon atoms per active group, said compound combining with calcium to form a product that is less soluble than calcium sulphate.

16. A method of preparing brine from an aqueous solvent and a solid alkali-metal halide containing calcium sulphate as an impurity comprising adding to the solid alkali-metal halide no later than simultaneous with the contact of the solvent with the halide a compound having at least one active group selected from the class consisting of sulphonate, sulphate, carboxylate, phosphate, phosphite, phosphonate and phosphonite radicals, said active group being attached to a hydrocarbon group containing between about 2 to 30 carbon atoms per active group, said compound combining with calcium to form a product that is less soluble than calcium sulphate.

17. A method according to claim 1 wherein said inhibiting compound is soluble to the extent of at least 2 milligrams per liter of solution.

18. A method according to claim 1 wherein said inhibiting compound is in the form of a salt selected from the class consisting of the alkali-metal and ammonium salts.

References Cited in the file of this patent
UNITED STATES PATENTS

| | | |
|---|---|---|
| 2,433,601 | Comstock | Dec. 30, 1947 |
| 2,683,649 | Hirsch | July 13, 1954 |
| 2,906,599 | Roland | Sept. 29, 1959 |

UNITED STATES PATENT OFFICE

CERTIFICATE OF CORRECTION

Patent No. 3,140,915　　　　　　　　　　　July 14, 1964

Bernard A. Axelrad et al.

It is hereby certified that error appears in the above numbered patent requiring correction and that the said Letters Patent should read as corrected below.

Column 3, line 10, for "derivate" read -- derivative --; line 49, for "demonstates" read -- demonstrates --; column 5, TABLE III, under the heading "Representative Compound", opposite Example No. 18, for "Sodium" read -- Disodium --.

Signed and sealed this 17th day of November 1964.

(SEAL)
Attest:

ERNEST W. SWIDER
Attesting Officer

EDWARD J. BRENNER
Commissioner of Patents